(12) United States Patent  (10) Patent No.: US 6,546,792 B1
Mann  (45) Date of Patent: Apr. 15, 2003

(54) TREE VOLUME MEASURMENT DEVICE

(75) Inventor: Mark P. Mann, Niles, MI (US)

(73) Assignee: American Electric Power Company, Inc., Columbus, OH (US)

( * ) Notice: Subject to any disclaimer, the term of this patent is extended or adjusted under 35 U.S.C. 154(b) by 0 days.

(21) Appl. No.: 09/379,989

(22) Filed: Aug. 24, 1999

(51) Int. Cl.[7] .............................. G01F 7/00; H04N 7/18
(52) U.S. Cl. ........................... 73/149; 348/135; 33/521
(58) Field of Search .......................... 356/379; 348/135, 348/141; 73/149; 33/521

(56) References Cited

U.S. PATENT DOCUMENTS

| | | | |
|---|---|---|---|
| 3,216,311 A | * | 11/1965 | Bibbero et al. ............. 348/135 |
| 3,261,967 A | * | 7/1966 | Rosin et al. ................. 348/135 |
| 3,919,551 A | | 11/1975 | Blincow ...................... 250/358 |
| 4,219,939 A | | 9/1980 | Turen ........................ 33/275 R |
| 4,754,552 A | * | 7/1988 | Warren ......................... 33/228 |
| 4,837,717 A | | 6/1989 | Wiklund et al. ............. 364/563 |
| 4,953,303 A | | 9/1990 | Carlin .......................... 33/284 |
| 5,294,953 A | * | 3/1994 | VanDeMoere .............. 354/219 |
| 5,884,240 A | | 3/1999 | Edgar et al. ................. 702/157 |

\* cited by examiner

Primary Examiner—Daniel S. Larkin
Assistant Examiner—Katina Wilson
(74) Attorney, Agent, or Firm—Standley & Gilcrest LLP

(57) ABSTRACT

The present invention includes tree crown volume measuring devices and measuring systems useful in determining the necessary amount of growth regulator product to be applied to trees near power lines. The present invention also includes measuring methods and processes using the devices of the present invention.

9 Claims, 2 Drawing Sheets

TREE VOLUME MEASURMENT DEVICE

BACKGROUND AND SUMMARY OF THE INVENTION

The present invention is in the field of dimension measurement devices, such as those that may be used to determine the crown volume of a tree.

This invention consists of a device and method for measuring tree growth in order to determine the necessary amount of growth regulator to be applied. Tree growth regulator (TGR) is a product that, when applied to a tree in an appropriate amount, slows the rate of growth. One purpose for the application of such a product is to lessen the frequency of trimming necessary to keep a given tree from coming into contact with overhead power lines. An accurate measurement of tree crown volume allows one to apply the appropriate amount of product. Without an accurate measurement, growth regulator may be applied excessively, raising the overall product cost to the company applying such regulator. Growth regulator can also be applied too sparingly, resulting in undesired tree growth. This excessive growth then requires the trimming of the tree, the avoidance of which was one purpose for the application.

The current method of determining the amount of TGR to apply to a tree involves a measurement of the diameter of the trunk of the tree at the chest height of the person making the measurement. This can lead to inaccurate amounts of product being applied for several reasons. The primary reason for the inaccuracies with the chest height method is that trunk diameter has little correlation with the crown volume of the tree, which is what a utility company is trying to control. To compensate, the amount of recommended product application was kept on the high side to ensure the efficiency of the product. This excessive application of growth regulator resulted in unnecessarily high costs to the utility company.

Although described with respect to the field of tree growth measurement, it will be appreciated that similar advantages of dimension measurement may obtain in other applications of the present invention. Such advantages may become apparent to one of ordinary skill in the art in light of the present disclosure or through practice of the invention.

The present invention includes dimension measuring devices and dimension measuring systems. The present invention also includes measuring methods and processes using the devices of the present invention. The methods and processes of the present invention may be applied using procedures and protocols known and used in the arts to which they pertain.

In one preferred embodiment of the present invention, the TGR volume box of the present invention comprises: (1) a card with an opening of predetermined dimension wherein the card is adapted such that a holder of the card can visually determine tree crown volume classification by holding the card so that the holder's line of sight to the viewed tree crown is through the opening, (2) an adjustable cord of an appropriate length fed through a hole in the card, and (3) a label containing trees species and corresponding application information.

The present invention may also include measurement processes and methods using the devices of the present invention. For example, the present invention may include a method of measuring tree crown volume comprising the steps of: (1) standing a predetermined distance from a tree; (2) holding a frame with an opening of predetermined size so that the line of sight of a holder of the frame to a viewed tree crown is through the opening; (3) viewing the crown volume of a tree through the opening in the frame; (4) determining if the bulk of the crown volume is viewable through the opening; and (5) classifying the tree crown size by whether or not the bulk of the crown volume is viewable through the opening. The frame used in this method may be included in a box structure or may be formed on a card.

DETAILED DESCRIPTION OF THE PREFERRED EMBODIMENT(S)

In accordance with the foregoing summary, the following presents a detailed description of the preferred embodiment of the invention that is currently considered to be the best mode.

The present invention consists of a card with a predetermined opening. By viewing the crown volume of a tree through the opening in the card, from an established distance, one can determine at a minimum whether the crown volume falls within a predetermined range or outside that range. By considering whether a tree falls into or outside the predetermined size range, a planner applying the TGR is able to determine what amount of product to apply.

Figure 1:
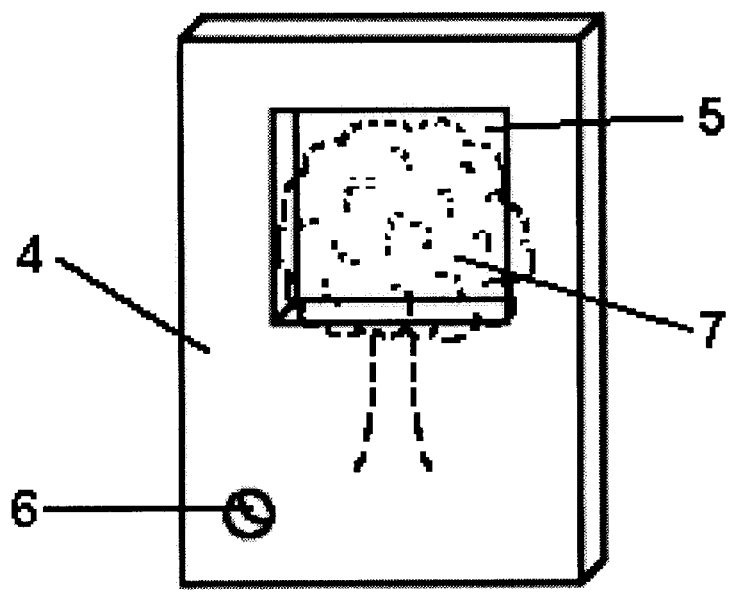
FIG. 1 is a front elevational view of a TGR volume box that may be used in accordance with one embodiment of the present invention.
Figure 2:
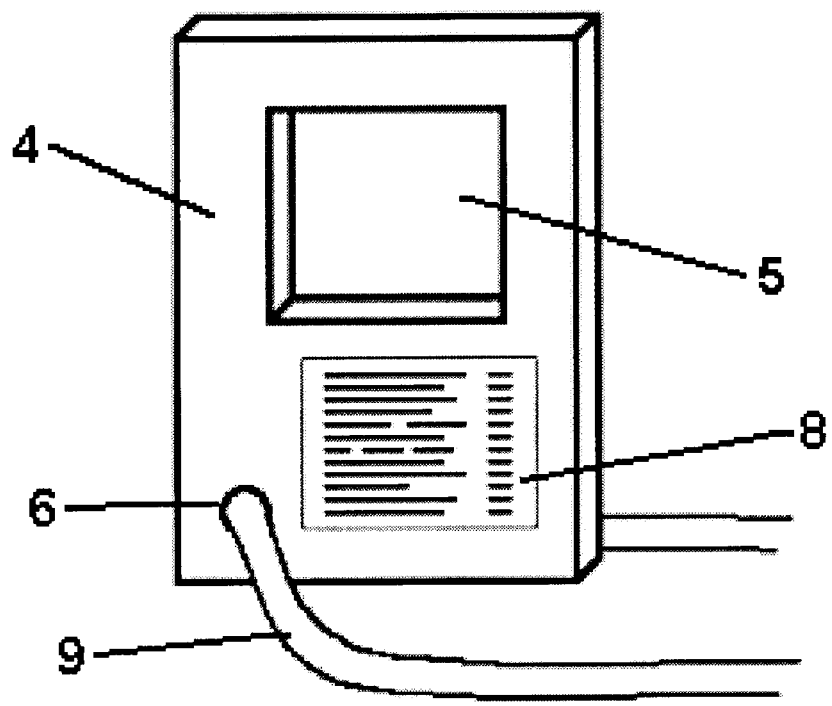
FIG. 2 is a front elevational view of a TGR volume box that may be used in accordance with one embodiment of the present invention.

FIG. 1 is a front elevational view of a TGR volume box device that may be used in accordance with one embodiment of the present invention. FIG. 1 shows a laminated 10 mil card 4. The preferred dimensions of the card are 4¾ inches×7¼ inches. The opening 5 comprising the predetermined area for viewing a tree 7 is shown, the preferred square opening having dimensions 3 inches×3 inches. There may be a ¼ inch hole 6 in the bottom left corner where an adjustable cord attaches. FIG. 2 shows the adjustable cord 9 running through the hole 6 in the card. This cord allows the planner to correctly adjust the distance from the eye to 6 inches. There is also a label 8 on the front of the card listing the tree species and the corresponding rates of TGR to be applied. The planner preferably stands sixty feet from the tree and holds the card six inches from the eye. Sixty feet is preferred because that is the approximate width of a standard two-lane road, measured sidewalk to sidewalk. This allows the planner to stand the proper distance from the tree simply by crossing to the sidewalk on the other side of the street. The entire crown of the tree, barring one or two stray limbs, will appear to the eye of the planner inside the box opening to fall into the "small to medium" crown class. Crowns stretching outside the viewable box opening fall into the "large" crown class. The planner then applies the appropriate amount of TGR, depending on the crown class.

The invention may also be produced using other materials and other dimensions to enable a planner to use the invention in different settings. For example, if the planner were to stand one hundred feet away from the tree being measured, a suitable downward adjustment in size of the box opening may be necessary to maintain trigonometric relationship (vice-versa if the planner is standing closer).

Furthermore, a box is not essential to the invention. A flat card with an appropriate opening is also useable. Practically any frame of appropriate size will accomplish the purpose of the present invention. And, practically any geometric shape (e.g., circle, oval, square, triangle, rectangle, etc.) for the opening in the frame will accomplish the purpose of the present invention as long as it is sized in relatively the same manner as set forth above.

Figure 3:
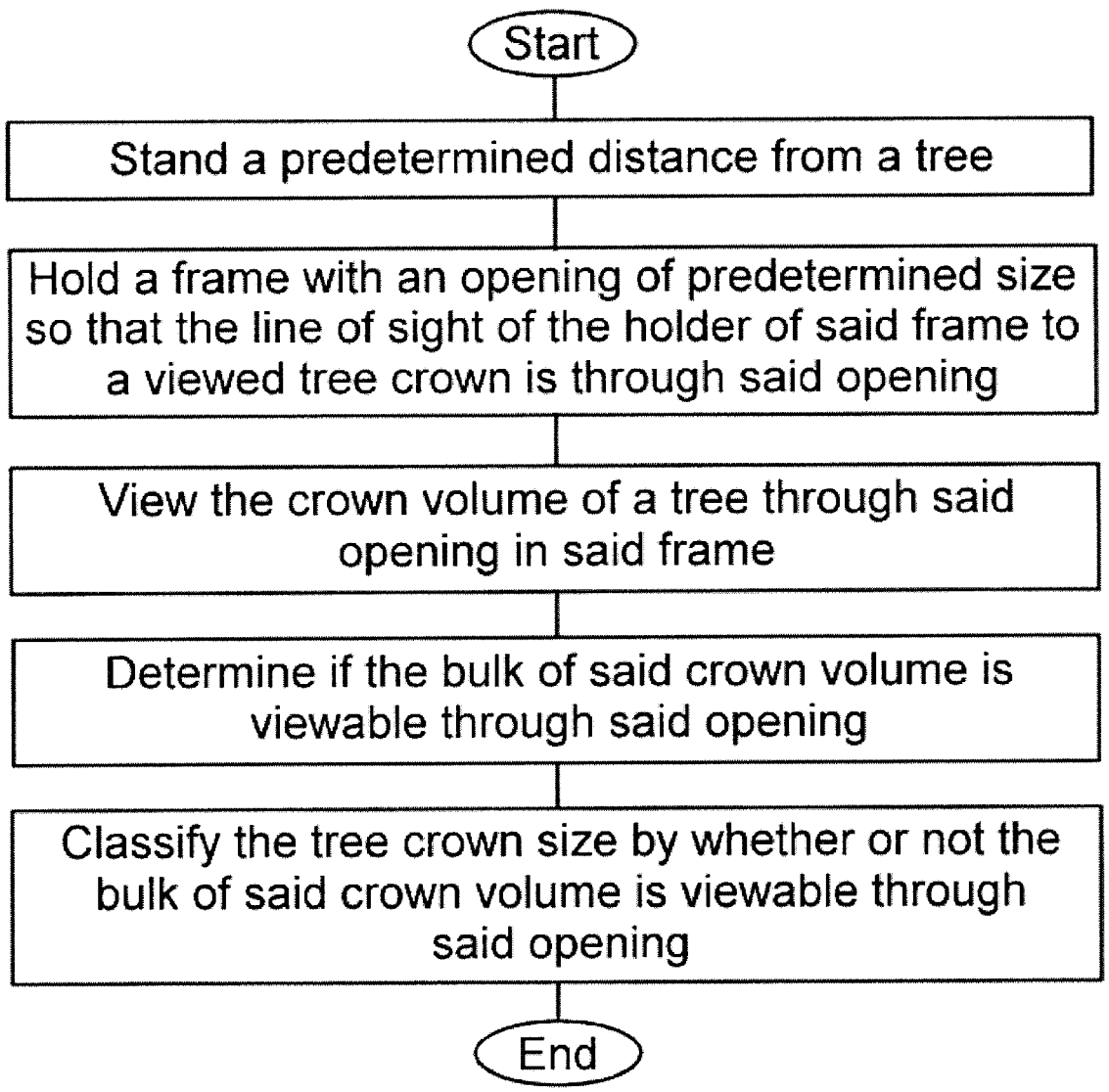
FIG. 3 is a flow chart showing a preferred set of steps for use of the device shown in FIG. 1.

Referring now to FIG. 3, there is shown a preferred method of measuring tree crown volume. The method involves standing a predetermined distance from a tree and holding a frame with an opening of predetermined size so that the line of sight of the holder of the frame to the viewed tree crown is through the opening. The holder may then view the crown volume through the opening in the frame, and subsequently determine if the bulk of the crown volume is viewable through the opening. The holder may then classify the tree crown size by whether or not the bulk of the tree crown volume is viewable through the opening.

Other uses for the present invention are also present. For example, city street lighting is impacted by tree growth. As trees grow larger they tend to obstruct light flow to the street below. The present invention is useful in the same manner described above in identifying trees that should receive growth regulator product to inhibit the trees' growth from interfering with or cutting off light flow to the street.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A tree measurement device, comprising:
   a card;
   an opening of predetermined size and shape located in said card; and
   a means for locating said card a proper distance from the eye of a user;
   wherein, when standing approximately a predetermined distance from said tree, said opening limits said user's view of a crown portion of said tree such that the volume of said crown portion may be classified.

2. A measurement device according to claim 1 wherein said means for locating said card the proper distance from the eye of a user is an adjustable cord.

3. A measurement device according to claim 1 additionally comprising a label containing tree species and growth regulator application information, applied to said card.

4. A measurement device according to claim 1 wherein the dimensions of said card are from about 2 inches to about 8 inches in width and from about 2 inches to about 10 inches in height.

5. A measurement device according to claim 1, wherein the dimensions of said opening are from about 1 inch to about 6 inches in width and from about 1 inch to about 8 inches in length.

6. A method of measuring tree crown volume comprising the steps of:
   standing a predetermined distance from a tree;
   holding a frame with an opening of predetermined size at substantially a predetermined distance from the eye of a holder of said frame, so that the line of sight of said holder of said frame to a viewed tree crown is through said opening;
   viewing the crown volume of a tree through said opening in said frame;
   determining if the bulk of said crown volume is viewable through said opening; and
   classifying the tree crown size by whether or not the bulk of said crown volume is viewable through said opening.

7. The method of claim 6, wherein said frame is included in a box structure.

8. The method of claim 6, wherein said frame is formed on a card.

9. The method of claim 6, wherein said opening in said frame is in the shape of a rectangle.

* * * * *